United States Patent [19]
Robinson

[11] Patent Number: 5,199,764
[45] Date of Patent: Apr. 6, 1993

[54] POWER LINEAR SEAT RECLINER

[75] Inventor: David L. Robinson, Sterling Heights, Mich.

[73] Assignee: Fisher Dynamics Corporation, St. Clair Shores, Mich.

[21] Appl. No.: 782,782

[22] Filed: Oct. 25, 1991

Related U.S. Application Data

[63] Continuation of Ser. No. 511,628, Apr. 20, 1990, abandoned, which is a continuation of Ser. No. 384,161, Jul. 24, 1989, Pat. No. 4,962,963.

[51] Int. Cl.$^5$ .............................................. B60N 2/22
[52] U.S. Cl. ................................... 297/361; 74/89.14; 74/89.15
[58] Field of Search ...................... 297/361, 362, 330; 74/89.14, 89.15

[56] References Cited

U.S. PATENT DOCUMENTS

| | | | |
|---|---|---|---|
| 4,635,491 | 1/1987 | Yamano et al. | 74/89.15 |
| 4,712,441 | 12/1987 | Abraham | 74/89.15 |
| 4,759,587 | 7/1988 | Bucka | 297/361 |
| 4,799,734 | 1/1989 | Periou | 297/361 |
| 4,802,374 | 2/1989 | Hamelin et al. | 74/89.14 |
| 4,949,585 | 8/1990 | Dauvegne et al. | 74/89.14 X |

*Primary Examiner*—Peter R. Brown
*Attorney, Agent, or Firm*—Harness, Dickey & Pierce

[57] ABSTRACT

A power linear seat recliner apparatus for controllably adjusting the angular position of a seat back relative to a seat cushion. The apparatus comprising a master recliner mechanism having an integrally mounted motor, a slave recliner mechanism and an actuator cable connecting the slave and master recliner mechanisms for transmitting torque from the motor to the slave recliner mechanism. The motor simultaneously drives each of the recliner mechanisms. The master and slave recliner mechanisms having a threaded rod assembly interconnected to a transmission assembly for providing desired speed reduction and linear reciprocable movement of the rod.

8 Claims, 7 Drawing Sheets

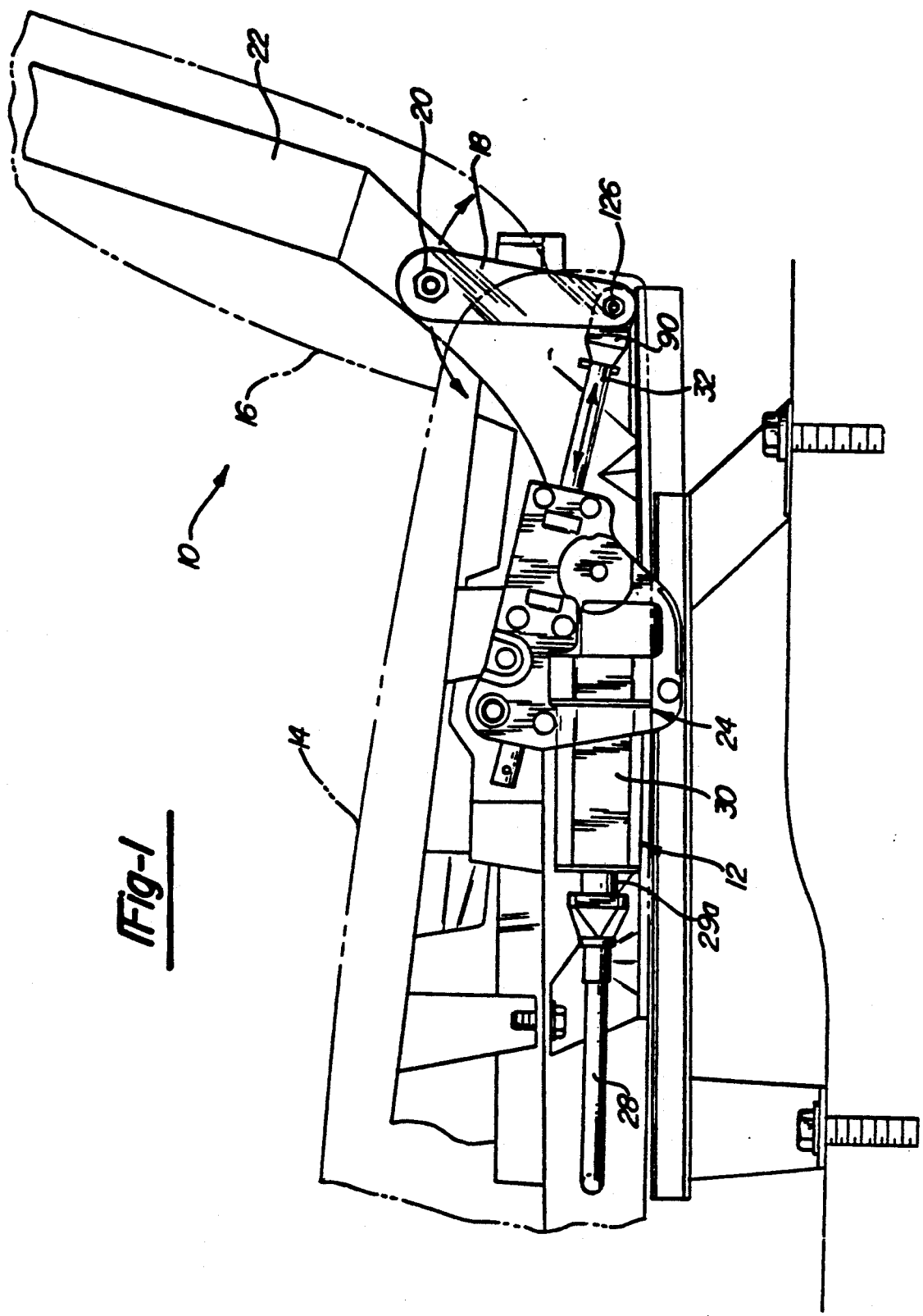

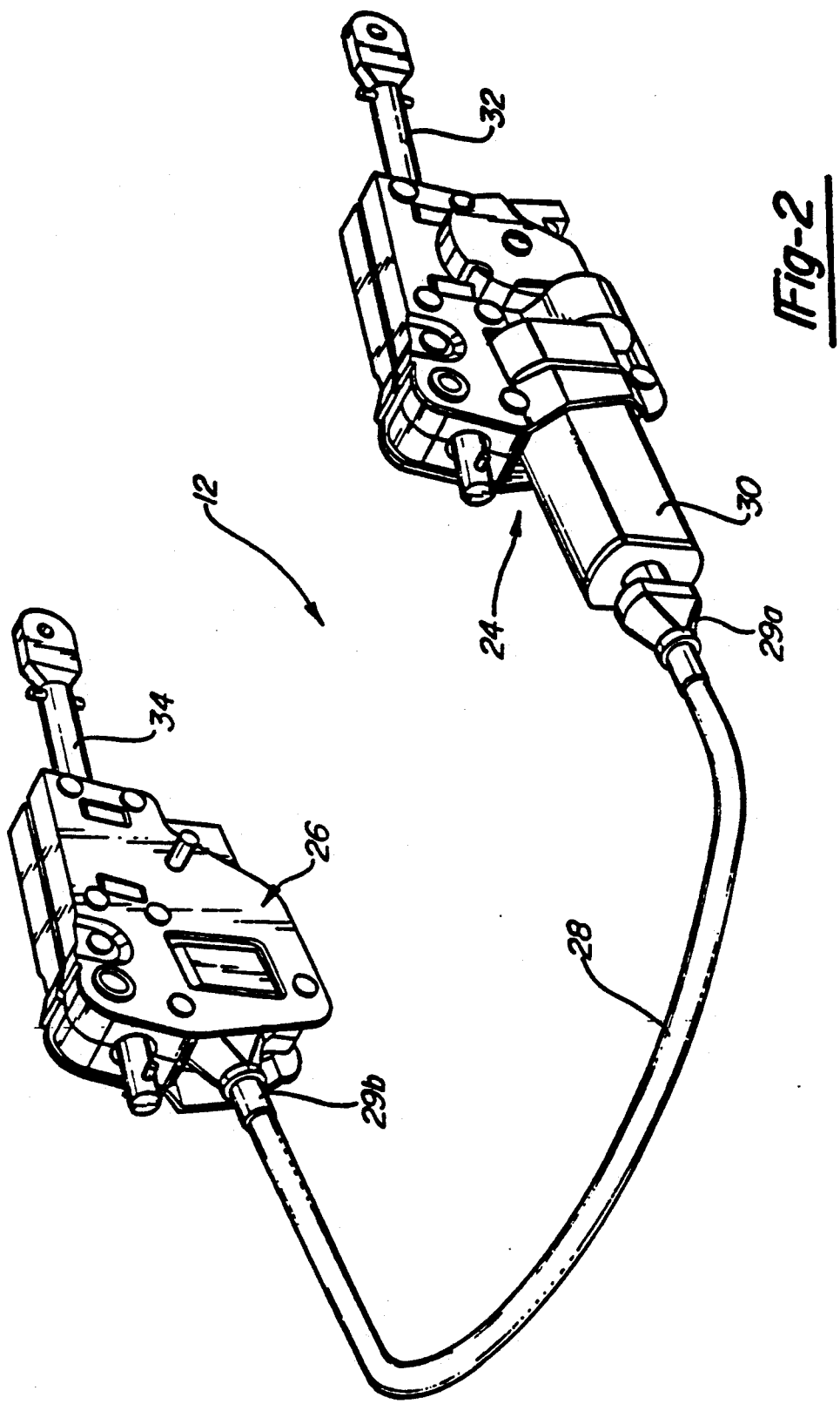

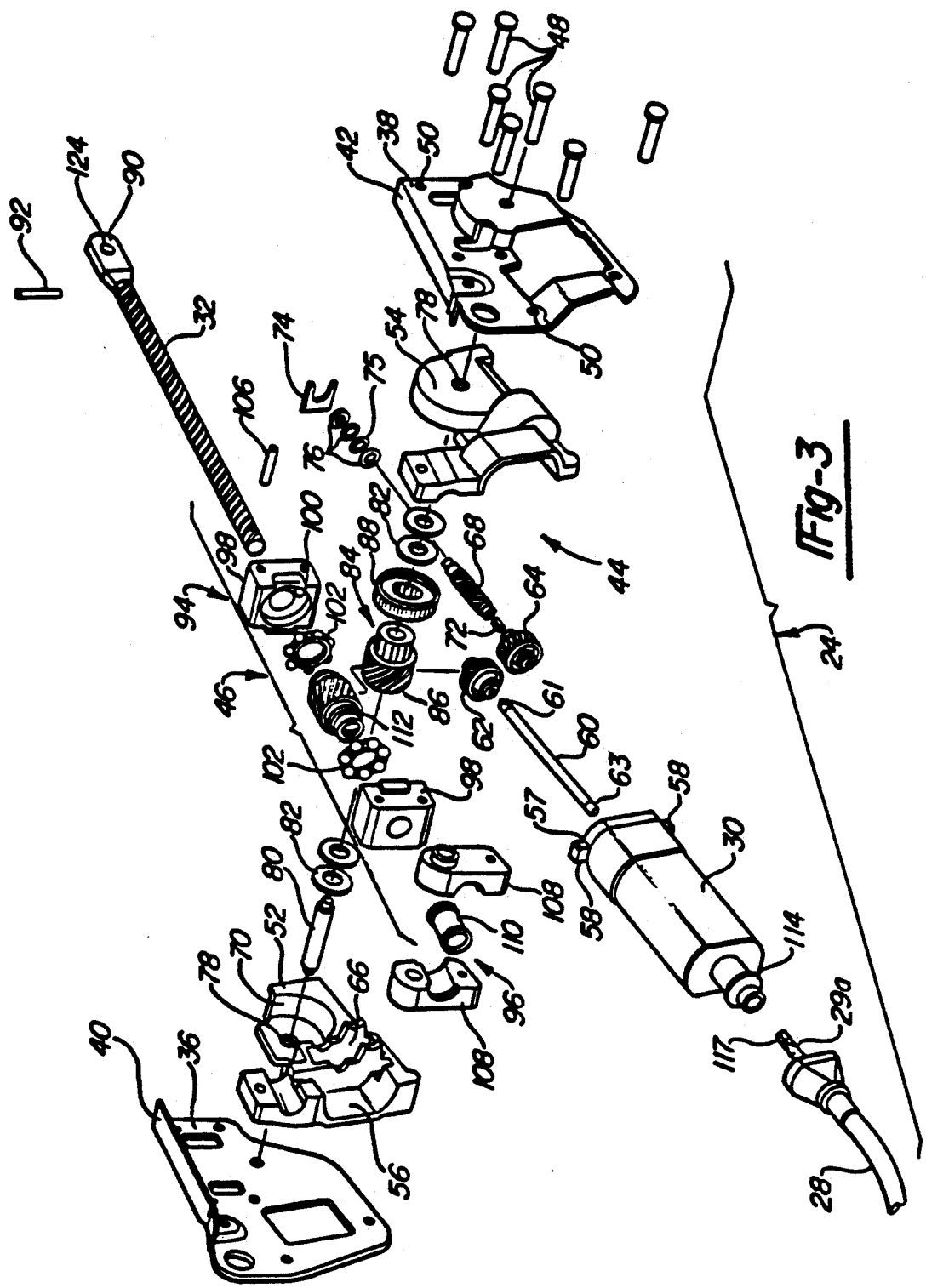

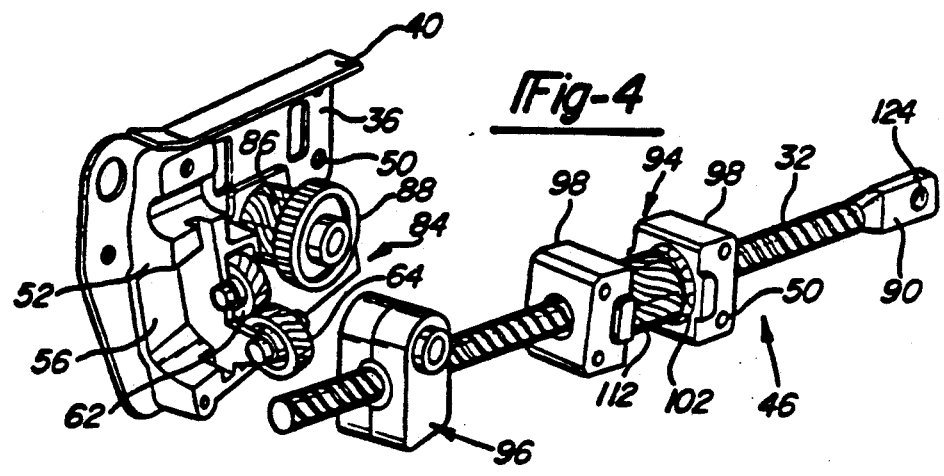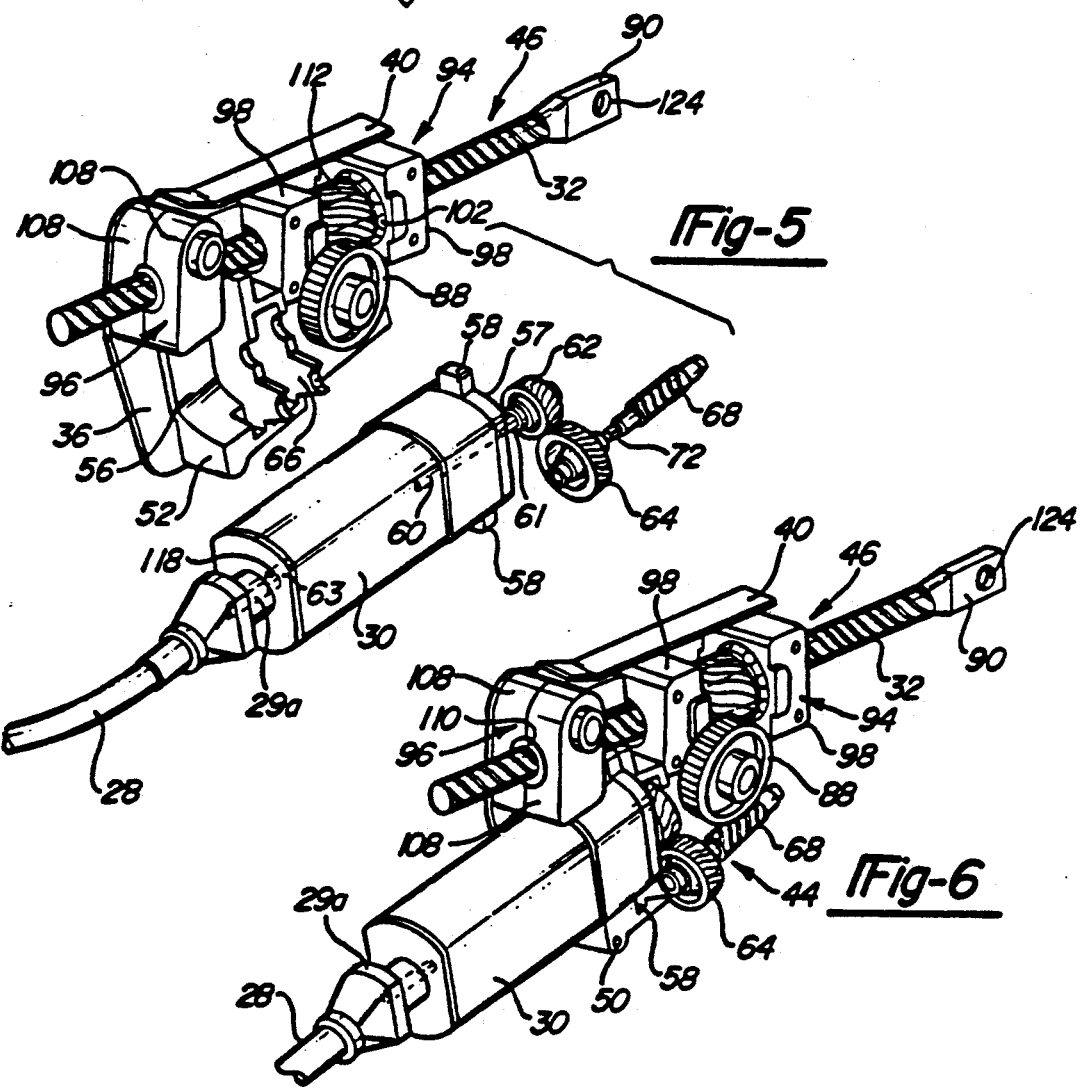

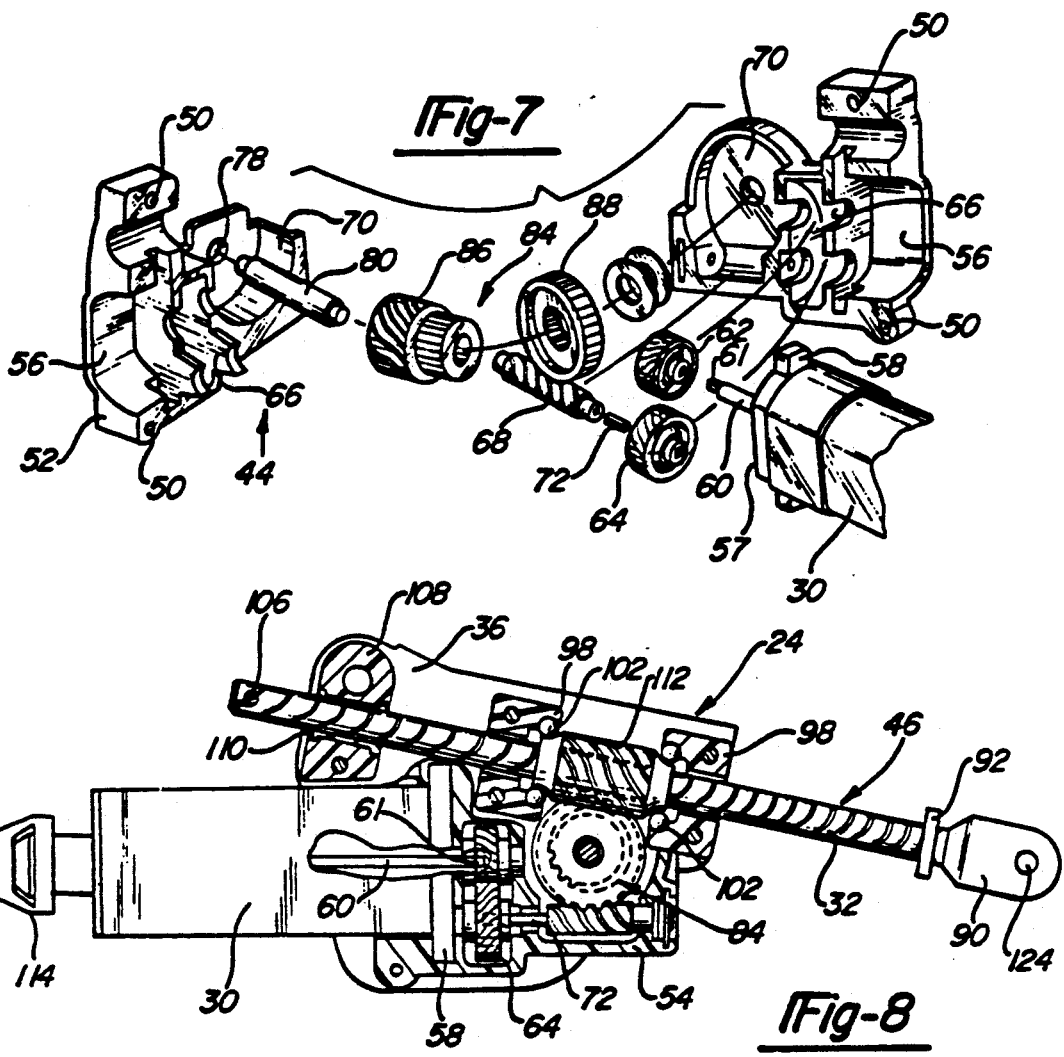
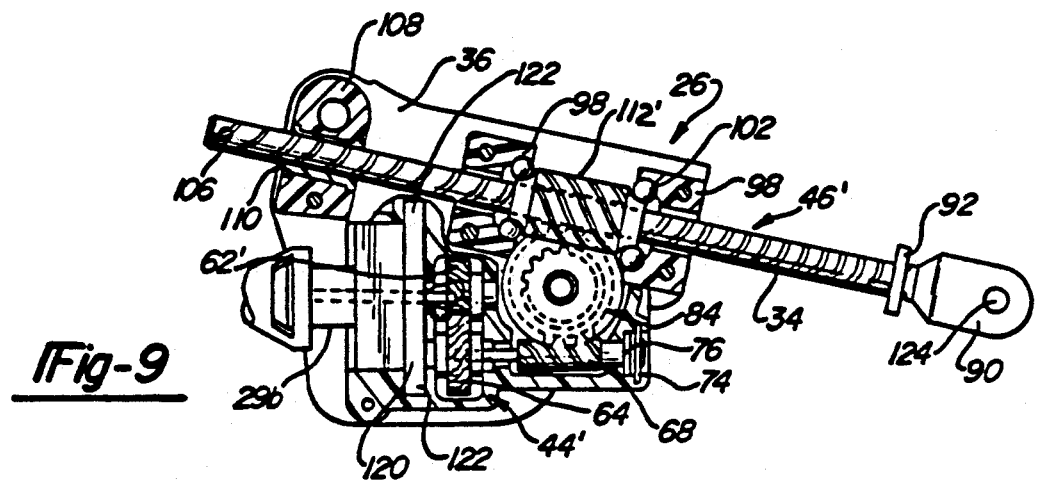

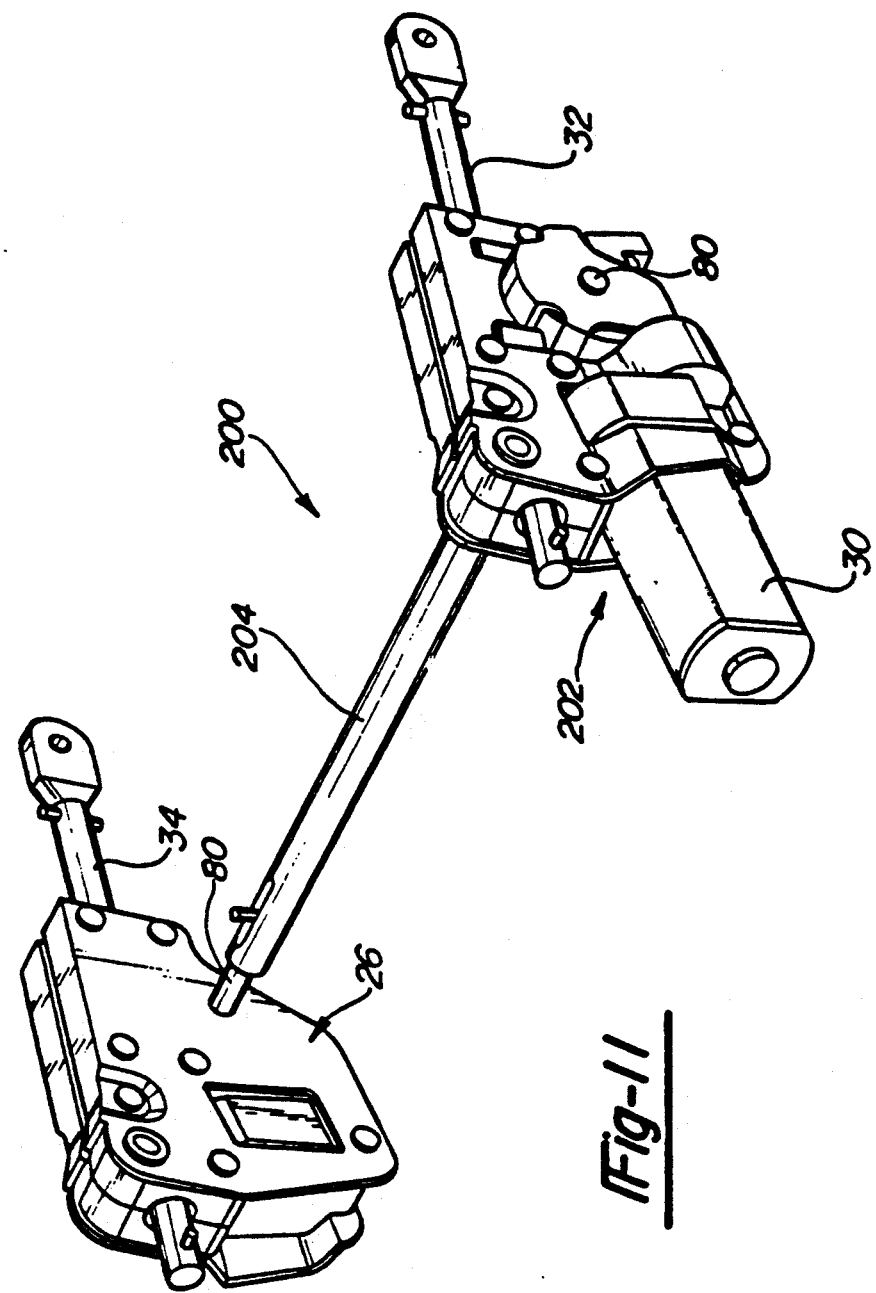

POWER LINEAR SEAT RECLINER

This is a continuation of Patent application Ser. No. 511,628, filed Apr. 20, 1990, now abandoned, which is a continuation of U.S. Patent application Ser. No. 384,162, which issued as U.S. Pat. No. 4,962,963, filed Jul. 24, 1989.

BACKGROUND AND SUMMARY OF THE INVENTION

The present invention relates to a linear seat recliner and, in particular, to a power linear seat recliner system for positioning and retaining a reclinable seat back of a vehicle seat in a desired angular position.

Conventional power linear seat recliner systems use a central motor which drives two actuator cables. The cables, in turn, plug into gear nuts which engage threaded shafts on opposite lateral sides of a seat. The threaded shafts, which reciprocate in a linear fashion, are secured to a pivotal mechanism which provides seat back reclining adjustment relative to the linear motion of the threaded shaft. However, such systems are unreliable in that the connection between the cables and the gear nuts are prone to premature failure and are generally noisy. Additionally, a larger motor is required because of the large torque and indirect speed reduction requirements. Further, conventional linear power seat systems are installed with the motor mounted directly under the seat cushion which necessitates a raised seat height, thereby reducing available headroom within the vehicle. Another disadvantage is that conventional power recliner systems cannot be assembled as a recliner subassembly for quality testing prior to installation into the seat structure.

It is therefore an object of this invention to provide a relatively simple design for a two-sided power linear seat recliner system which uses an integrally mounted motor to directly drive one side of the recliner system and motor driven actuation means for driving the opposite side of the system. The actuation means can include either a single cable or a torque tube provided to interconnect the two sides of the recliner system. The system components are assembled as a single unit before installation in a seat system. In fact, the present invention utilizes a large number of common and mirror imaged components within the opposing recliner mechanisms so as to substantially reduce costs while simplifying the assembly and operation thereof. Further, because of the similarity of structure between the master recliner mechanism and the slave recliner mechanism, the cable or the torque tube can be made of any desired length to permit use on seat systems having different widths.

Other advantages and features will become apparent from the following specification taken in connection with the accompanying drawings.

BRIEF DESCRIPTION OF THE DRAWINGS

FIG. 1 is a side elevational view of a vehicle seat according to a first preferred embodiment of the instant invention, illustrating the operational association between the power linear seat recliner system and common seat structure support;

FIG. 2 is a pictorial view of a power linear seat recliner system, shown as an assembly in accordance with the first preferred embodiment of the present invention;

FIG. 3 is an exploded perspective view of the master recliner mechanism shown in FIG. 2;

FIGS. 4 through 6 are exploded perspective views of the master recliner mechanism showing the assembled orientation and functional interaction of the various components;

FIG. 7 an exploded perspective view of the transmission assembly shown in direct operative association, with a motor as utilized in the master recliner mechanism shown in FIG. 3;

FIG. 8 is a side elevational view, partially broken away, illustrating the orientation of the cable with the motor, transmission assembly and rod assembly of the master recliner mechanism;

FIG. 9 is a side elevational view, partially broken away, illustrating the orientation of the cable with the transmission and rod assembly of the slave recliner mechanism.

FIG. 11 is a pictorial view of a power linear seat recliner system, shown as an assembly in accordance with the second preferred embodiment.

DETAILED DESCRIPTION OF THE PREFERRED EMBODIMENT

Figure 10:
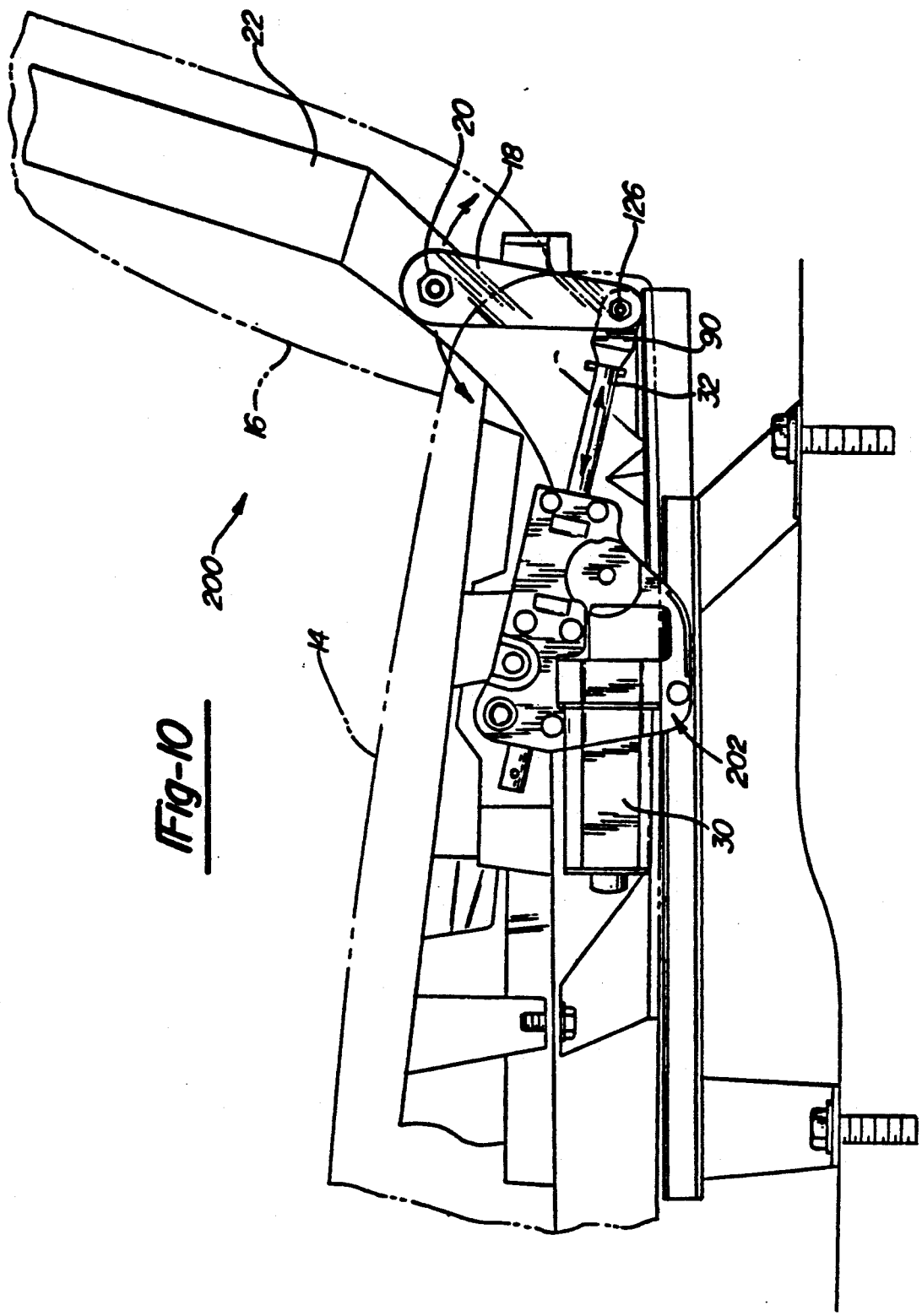
FIG. 10 is a side elevational view of a second preferred embodiment of the present invention.

Referring now to the drawings, FIG. 1 shows, in schematic fashion, a vehicle seat assembly 10 incorporating a power linear seat tilt-adjusting system in accordance with the present invention. The seat assembly 10 is of the type conventionally installed in the front passenger compartment of a motor vehicle and comprises power linear recliner system 12, a seat cushion 14 and a seat back 16 functionally interconnected to permit the angle therebetween to be controllably varied. The seat back 16 is coupled for pivotal movement relative to the seat cushion 14 to a lower recliner structure 18 as by a fastener 20 so as to permit the seat back 16, supported on an upper recliner structure 2, to be pivoted to a desired reclining position. The upper and lower reclining structures, 18 and 22, respectively, are typically fabricated of metal plates suitably configured to provide stable pivotal motion and which are mirror images of one another at their opposite lateral sides.

The power linear recliner system 12 is provided for adjustably controlling reclining movement of the seat back 16 relative to the seat cushion 14. In accordance with the first preferred embodiment, the power linear recliner system 12 preferably includes a master recliner mechanism 24, a slave recliner mechanism 26, and an actuator cable 28 with an axially extending core 29 having opposite ends 29a and 29b connected for transferring torques from the master recliner mechanism 24 to the slave recliner mechanism 26 As will be hereinafter detailed, actuation of direct drive motor 30, integrally assembled into master recliner mechanism 24, produces simultaneous and substantially identical linear reciprocal motion of threaded rod 32 associated with master recliner mechanism 24 and threaded rod 34 associated with slave recliner mechanism 26. Actuation of the motor 30 is provided by a position control switch (not shown) provided within the passenger compartment and in close proximity to seat assembly 10 to permit the vehicle operator to selectively recline seat back 16 relative to seat cushion 14 in either direction through a range of angular positions.

Referring now to FIGS. 3 through 8, the functional association of the components assembled in master recliner mechanism 24 are illustrated. Master recliner mechanism 24 comprises a generally rectangular housing that includes a first side plate 36 and second side plate 38 each having a flange 40 and 42, respectively, upstanding therefrom, a motor 30, a transmission assembly 44, a rod assembly 46 and rivets 48. The plates 36 and 38, transmission assembly 44 and rod assembly 46 include an array of corresponding cylindrical apertures 50 sized to receive the rivets 48. Each rivet 48 passes through the apertures 50 to secure the plates 36 and 38, transmission assembly 44, rod assembly 46 and motor 30 firmly together as an assembly. Preferably, first and second side plates 36 and 38 are fabricated from a relatively thin gauge sheet metal, however, any suitable material could be readily adapted. Master recliner mechanism 24 is then secured to lateral support structure provided under seat assembly 10 in a semi-permanent fashion. Repair or replacement of either recliner mechanism or the cable can be easily performed.

Transmission assembly 44 is provided to change the rotational motion of axially extending drive cable 60 into, linear reciprocating motion of rod 32. Drive cable 60 is removably coupled within motor 30 to a rotatable motor armature (not shown) for transferring the torque generated by motor 30 to the transmission assembly 44. The direction of linear motion of rod 32 is dependent on the direction of rotation of motor 30. Transmission assembly 44 comprises a first and second housing 52 and 54, respectively, each having a first and second face with the first faces being abutted so as to define a series of recesses which are configured to confine the components of transmission assembly 44 to be described. Preferably, transmission housings 52 and 54 are made from plastic, however any suitable material could be utilized. Specifically, first and second transmission housings, 52 and 54, are configured to define a first recess 56 sized to securely mount motor 30 therein. Motor 30 has a rearward most end 57 having vertically extending, oppositely oriented, flanges 58 to secure and align motor 30 within the similarly configured first recess 56. Extending axially from the rearward most end of motor 30 is a first end 61 of drive cable 60 which transfers the rotational motion generated by the torque of motor 30 to transmission assembly 44.

A pair of helical spur gears, 62 and 64, respectively, are provided and are maintained in meshing relationship in second recess 66 of transmission assembly 44. In particular, first end 61 of drive cable 60 is. directly coupled to drive helical spur gear 62 and helical spur gear 64. Preferably, the helical spur gears 62 and 64 are not identical so that an initial speed reduction is provided. Preferably, the initial speed reduction provided is at least about 25% with a corresponding increase in torque. A worm gear 68 is secured to transmission housing 54 within a lower section of third recess 70. Worm gear 68 is axially aligned with, and coupled to rotate with helical spur gear 64. In this manner, the rotation of drive cable 60 is transferred to worm gear 68 via the rotation of helical spur gears 62 and 64. Worm gear 68 is coupled for rotation with helical spur gear 64 via drive shaft 72. Thrust plate 74, roller bearing 75, and thrust washers 76 are provided to inhibit excessive thrust forces while maintaining worm gear 68 within third recess 70. The remainder of third recess 70 is substantially circular in configuration and is provided with a central aperture 78. Aperture 78 extends through first side plate 36, first transmission housing 52, second transmission housing 54, and second side plate 38. Shaft 80 is axially aligned and secured for non-rotation within aperture 78 and is substantially enclosed within transmission assembly 44. Washers 82 are provided on opposite ends of shaft 80 to provide low friction bearing surfaces. Axially rotating on shaft 80 is a splined gear set 84 consisting of a helical spur gear 86 splined to helical spur gear 88. The orientation and positioning of the splined gear set 84 within transmission assembly 44 is such that helical spur gear 88 meshingly engages, and is driven by, worm gear 68. Helical spur gear 86 is interconnected with rod assembly 46 to drive threaded rod 32 in reciprocating linear motion to be described hereinafter.

Rod assembly 46 comprises an elongated threaded rod 32 having a first end defining a flat surface 90 and a retention pin 92 which prevents its forward withdrawal from master recliner mechanism 24 while providing a full rearward stop of seat back 16. Rod 32 is supported within master reclining mechanism 24 by helical gear nut 112 which is nested within bearing housing assembly 94 and a support housing assembly 96. Bearing housing assembly 94 includes a first and second bearing housings 98 each having an inner race surface 100 in which ball bearings 102 are disposed. Rod 32 axially moves through bearing housing assembly 94 and support housing 96 upon actuation of motor 30 to provide the desired linear motion. Both bearing housing assembly 94 and support housing assembly 96 are secured between inner side plate 36 and outer side plate 38 by rivets 48 extending through apertures 50. The second end 104 of threaded rod 32 extends through support housing assembly 96 and includes a retention pin 106 which prevents its rearward withdrawal from the master recliner mechanism 24 while providing a full forward stop of the seat back 16.

Support housing assembly 96 is comprised of first and second support members 108 defining a central bore in which a cylindrical polymeric sleeve bushing 110 is disposed. Threaded rod 32 extends through sleeve bushing 110. Provided between, and supported by, the ball bearings 102, within the bearing housing assembly 94, is helical gear nut 112 which is in meshing engagement with helical spur gear 86 of the splined gear set 84. Helical gear nut 112 is provided with an internal thread surface through which rod 32 is threadingly interconnected. Therefore, rotation of helical gear nut 112 produces linear movement of threaded rod 32. Specifically, remote actuation of motor 30 by the vehicle operator acts to generate rotation of drive cable 60 which, in turn, drives helical spur gears 62 and 64. Worm gear 68, driven by helical spur gear 64, drives helical spur gear 88 of spline gear set 84. Since helical gear 86 is splined to helical spur gear 88, it drives helical gear nut 112. The direction of rotation of drive cable 60 directly determines the direction of linear motion of rod 32. Rotation of motor 30 in one direction generates linear motion of rod 32 in a first direction while the opposite rotation of motor 30 generates linear motion of rod 32 in a second direction.

The disclosed gear train confined within transmission assembly 44 provides for a predetermined level of speed reduction of rod 32 relative to the speed of , rotation of motor 30. While the preferred embodiments disclose a specific gear train configuration for transmission assembly 44 it is contemplated that any gear train capable of providing the desired speed reduction and torque transmission could be readily utilized Motor 30 is provided with a hollow armature shaft (not shown), configured to have a square female receptor 118 adapted to accept a male end 117 extending from cable core end 29a. The second end 63 of drive cable 60 is coupled with male end 117 by inserting both into receptor 118 of motor 30. In this manner, the direction of rotation produced through actuation of motor 30 is transferred to drive cable 60 and cable core 29 simultaneously.

The opposite end 29b of cable core 29 also has a male end 117 which is coupled to slave recliner mechanism 26 and is enclosed in a housing 120. Helical spur gear 62 has a female receptor configured to accept male end 117 of cable end 29b so as to be directly coupled to helical spur gear 62 of transmission assembly 44'. Housing 120 is configured to be identical to the rear-most end of motor 30 so as to have flanges 122 identical to flanges 58 of motor 30. Because of this, the need for specialized or different transmission housing members for the slave recliner mechanism 26 is eliminated.

As is apparent from FIGS. 2, 8 and 9, slave recliner mechanism 26 is comprised of many components (i.e. transmission assembly 44', rod assembly 46'), that are common with, or mirror images of, those of master recliner mechanism 24, except for motor 30, housing 120 and oppositely threaded gear nut 112' and rod 34. The commonality of assembly components provides for reduced cost and the ability to subassemble power linear recliner system 12 as a unit. Additionally, this enables use of an integral motor for directly driving master recliner mechanism 24 while simultaneously providing concurrent actuation of slave recliner mechanism 26 via a single cable 28. While the preferred embodiments disclose side plates and transmission housings for slave recliner mechanism 26 which are a mirror image of those utilized for master recliner mechanism 24, it is contemplated that such components can be universally configured to be common to each recliner mechanism within the fair meaning of the present invention.

In operation, the vehicle operator remotely actuates the motor to rotate the drive cable 60 and cable core 29 in either direction so as to generate the desired seat back adjustment angle. Rotation of direct drive cable 60 and cable core 29 by motor 30 in one direction will provide backward reclining movement of seat back 16 while opposite rotation of motor 30 will provide forward motion of seat back 16. Flat surface 90 provided on the rearward end of threaded rods 32 and 34 has a bore 124 which is securely fastened to lower recliner mechanism 18 via fastener 126. Linear motion of threaded rods 32 and 34 is thereby changed into pivotable motion of seat back 16. It is contemplated that other pivotable connections between threaded rods 32 and 34 and the seat back 16 can be utilized based on the structural configuration of seat assembly 10.

Power linear recliner system 12 permits fine adjustment of seat back 16 relative to seat cushion 14. The speed of tilt-back adjustment is predicated on the gear ratios selected for use in transmission assembly 44. In this light, the system 12 can be designed for each specific vehicle application with relative ease. Preferably, transmission assembly 44 provides a speed reduction while permitting use of a more efficient, smaller motor 30 than typically used in conventional systems. An additional advantage to power linear recliner system 12 is that motor 30 is integrally associated with master recliner mechanism 24. As such, the motor is mounted to structural members of seat assembly 10 instead of centralized mounting of the motor under the seat which is common in conventional linear seat systems.

Referring now to FIGS. 10 and 11, a second preferred embodiment of the present invention is disclosed. The power linear recliner system 200 is provided for adjustably controlling reclining movement of the seat back 16 relative to the seat cushion 14. The power linear. recliner system 200 preferably includes a master recliner mechanism 202, a slave recliner mechanism 26, and a torque tube 204 coupled for rotation with shafts 80 of both master recliner mechanism 202 and slave recliner mechanism 26 for transferring torque from the master recliner mechanism 202 to the slave recliner mechanism 26. According to the second preferred embodiment, shafts 80 are rotatably disposed within transmission assemblies 44 and 44'. As previously detailed, actuation of direct drive motor 30, integrally assembled into master recliner mechanism 202, produces simultaneous and substantially identical linear reciprocal motion of threaded rod 32 associated with master recliner mechanism 202 and threaded rod 34 associated with slave recliner mechanism 26. Actuation of the motor 30 is provided by a position control switch (not shown) provided within the passenger compartment and in close proximity to seat assembly 10 to permit the vehicle operator to selectively recline seat back 16 relative to seat cushion 14 in either direction through a range of angular positions. In this manner, the direction of rotation produced through actuation of motor 30 is transferred to drive cable 60 which drives, via the gear train, shaft 80 of master recliner mechanism 202. In turn, shaft 80 of master recliner mechanism 202 drives torque tube 204. Torque tube 204 then, in turn, drives shaft 80 of slave recliner mechanism 26.

As is apparent from the drawings, the second embodiment utilizes many of the components which are identical to those used with the first preferred embodiment.

It is also contemplated that the master recliner mechanism 202 of the second preferred embodiment can be employed without need of a slave recliner mechanism 26 or torque tube 204 in those vehicular seat applications where stable simultaneous lateral inclination is not as critical. Such a condition is contemplated when the recliner support structure for the seat back 16 provides sufficient lateral and angular support such that a one-sided power linear seat recliner system is sufficient. In such a system, the master recliner mechanism 202 would be mounted to one lateral side of the seat support structure for seat cushion 14. Flat surface 90 provided on the rearward end of threaded rod 32 would be fastened to lower recliner structure 18 via fastener 126. As such, linear motion of threaded rod 32 is transformed into pivotable motion of seat back 16 relative to seat cushion 14.

Those skilled in the art can appreciate that other advantages can be obtained from the use of this invention and that modifications can be made without departing from the true spirit of the invention after studying the specification, drawings and following claims.

What is claimed is:

1. A seat assembly comprising:
   a seat member;
   a seat back coupled to said seat member;
   pivot means for permitting pivotal movement of said seat back;
   a rod assembly including an elongated threaded rod having one end connectable to said pivot means, and a rotatable gear nut having an internally threaded surface such that said threaded elongated rod is intermeshed with said internally threaded surface of said gear nut for producing linear non-rotational motion of said elongated rod upon rotation of said gear nut; and a recliner mechanism secured to said seat member and adapted to support said gear nut such that said elongated rod moves relative to said recliner mechanism and said gear nut, said recliner mechanism including an integrally mounted motor and a transmission assembly provided for coupling said gear nut to an output member of said motor, said transmission assembly including a housing having a first recess configured to securably confine a portion of said motor within said recliner mechanism, a second recess configured to receive first and second intermeshed gears such that said first gear is coupled for rotation to said motor output member, and a third recess configured to receive a worm gear coupled for rotation to said second gear, said housing further adapted to support a transversely extending non-rotatably shaft having a splined gear set mounted for free rotation thereon, said splined gear set being intermeshed with said worm gear so as to be rotatably driven thereby, said transmission assembly operable for controllably reducing the speed of said linear non-rotational motion of said elongated rod with respect to the rotational speed of said motor output member such that selective actuation of said motor acts to rotate said gear nut for generating said linear non-rotational movement of said elongated rod relative to said recliner mechanism for controllably adjusting the angular position of said seat back relative to said seat member.

2. The seat assembly according to claim 1 wherein rotation of said motor output member in one direction linearly moves said elongated rod for lowering said seat back while rotation of said motor output member in an opposite direction linearly moves said elongated rod for raising said seat back.

3. The seat assembly according to claim 1 wherein said splined gear set includes a third gear intermeshed with said worm gear and a fourth gear splined to said third gear for rotation therewith, and wherein external threads of said gear nut are engageably intermeshed with said fourth gear of said transmission assembly.

4. A power linear recliner assembly for a vehicle seat having a seat frame and including a seat bottom member defining opposite sides joining forward and rearward ends thereof, a seat back member and pivot means adjacent the rearward end of said seat bottom member for permitting pivotal movement of said seat back member relative to said seat bottom member, comprising:

a motor having an output shaft defining a motor axis;

a threaded rod connectable at one end to said pivot means and having associated therewith an axis;

a transmission assembly including a transmission housing and gear reduction means coupled between said motor output shaft and said threaded rod for converting the rotational motion of said motor output shaft to linear motion of said threaded rod; said transmission housing comprising first and second housing halves defining a first forwardly facing opening for receiving said motor, a second rearwardly facing opening for receiving said threaded rod, and internal recesses for supporting and locating said gear reduction means, said first and second housing halves being configured to capture said motor and said gear reduction means when joined to permanently connect said motor to said transmission assembly so as to form a unitary assembly with the axes of said motor and said threaded rod being oriented substantially parallel with the side of said bottom member; and mounting means for mounting said unitary assembly to said seat frame adjacent to the side of said seat bottom member.

5. In an automotive seat assembly having a seat back and a seat bottom defining sides joining forward and rearward ends thereof, a power linear seat recliner apparatus for controllably adjusting the angular position of the seat back relative to the seat bottom in response to remote actuation by the operator, comprising a recliner mechanism secured adjacent to the side of said seat bottom and including a motor having an output shaft defining a motor axis, a threaded rod defining an axis and connected at one end to said seat back and coupled at its other end to a transmission assembly including a transmission housing and gear reduction means coupled between the output shaft of the motor and said threaded rod and including a rotatable gear nut having internal threads in meshed engagement with external threads on said threaded rod for converting the rotational motion of said motor output shaft to linear fore and aft motion of said threaded rod, said transmission housing having a first forward facing opening and a first recess configured to receive and securably confine at least one end of the motor, a second recess configured to receive said gear reduction means coupled for rotation with the output shaft of the motor and including a worm gear for rotatably driving said gear nut, and a second rearward facing opening for receiving the other end of said threaded rod, such that the output shaft of the motor is permanently coupled to said gear reduction means and the axes of said motor and said threaded rod are substantially coplanar and aligned with the side of said seat bottom.

6. The automotive seat assembly of claim 5 wherein said gear reduction means further includes first gear means coupled between the output shaft of the motor and said worm gear and second gear means coupled between said worm gear and said gear nut.

7. The automotive seat assembly of claim 6 wherein said second gear means includes a third gear intermeshed with said worm gear and a fourth gear splined to said third gear for rotation therewith, and wherein external threads on said gear nut are engageably intermeshed with said fourth gear.

8. The power recliner mechanism of claim 7 wherein said mounting means comprises first and second plate halves for capturing said unitary assembly when joined, said plate halves being adapted for fastening directly to said seat frame.

* * * * *